United States Patent
Cudak et al.

(10) Patent No.: US 10,248,108 B2
(45) Date of Patent: *Apr. 2, 2019

(54) THREE-DIMENSIONAL PRINTING BASED ON A LICENSE

(71) Applicant: International Business Machines Corporation, Armonk, NY (US)

(72) Inventors: Gary D. Cudak, Wake Forest, NC (US); Lydia M. Do, Raleigh, NC (US); Christopher J. Hardee, Raleigh, NC (US); Adam Roberts, Moncure, NC (US); John M. Weber, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 265 days.

This patent is subject to a terminal disclaimer.

(21) Appl. No.: 14/992,052

(22) Filed: Jan. 11, 2016

(65) Prior Publication Data

US 2017/0197368 A1    Jul. 13, 2017

(51) Int. Cl.
  *G05B 19/4099*    (2006.01)
  *G06F 17/50*      (2006.01)

(52) U.S. Cl.
  CPC ......... *G05B 19/4099* (2013.01); *G06F 17/50* (2013.01); *G05B 2219/35134* (2013.01); *G05B 2219/49007* (2013.01); *G06F 2217/12* (2013.01); *Y02P 90/265* (2015.11)

(58) Field of Classification Search
  CPC . B29C 67/0055; B29C 67/0088; B33Y 10/00; B33Y 30/00; B33Y 50/02; G05B 19/4099; G05B 2219/35134; G05B 2219/49007

USPC .......................................................... 700/98
See application file for complete search history.

(56) References Cited

U.S. PATENT DOCUMENTS

| | | | |
|---|---|---|---|
| 8,175,734 B2 | 5/2012 | Fogel et al. | |
| 9,563,984 B2 * | 2/2017 | Willis | G06T 19/20 |
| 9,623,604 B2 * | 4/2017 | Glazberg | B29C 67/0051 |
| 9,679,085 B2 * | 6/2017 | Cudak | G06F 17/50 |
| 10,078,325 B2 | 9/2018 | Gunnarsson et al. | |
| 2009/0164379 A1 | 6/2009 | Jung et al. | |
| 2011/0178619 A1 * | 7/2011 | Jung | G05B 19/0426 700/95 |
| 2012/0124172 A1 | 5/2012 | Sparks | |
| 2014/0058959 A1 * | 2/2014 | Isbjornssund | G06F 21/10 705/310 |

(Continued)

FOREIGN PATENT DOCUMENTS

WO    2013149296 A1    10/2013

OTHER PUBLICATIONS

IBM, "List of IBM Patents or Patent Applications Treated as Related (Appendix P)," Apr. 28, 2016, p. 1-2.

(Continued)

*Primary Examiner* — Chun Cao
(74) *Attorney, Agent, or Firm* — Robert J. Shatto

(57) ABSTRACT

A schematic for an object to print using a 3D printer is received. Based on the schematic, at least one customizable characteristic of the object that is licensed to a user identified. The at least one customizable characteristic of the object is modified to adjust the print instructions customized for the object. The modified object is printed.

11 Claims, 5 Drawing Sheets

(56) References Cited

U.S. PATENT DOCUMENTS

| | | | |
|---|---|---|---|
| 2014/0074272 A1* | 3/2014 | Cowden, IV | G06F 17/50 |
| | | | 700/97 |
| 2014/0117585 A1 | 5/2014 | Douglas et al. | |
| 2014/0283104 A1* | 9/2014 | Nilsson | G06F 21/10 |
| | | | 726/26 |
| 2015/0051999 A1* | 2/2015 | Apsley | G06Q 30/0621 |
| | | | 705/26.5 |
| 2015/0170242 A1* | 6/2015 | Bjorndahl | G06Q 30/0621 |
| | | | 705/26.5 |
| 2016/0042255 A1 | 2/2016 | Ganesh et al. | |
| 2016/0067927 A1 | 3/2016 | Voris et al. | |
| 2016/0086258 A1* | 3/2016 | Romes | G06Q 30/0641 |
| | | | 705/27.1 |
| 2017/0039363 A1* | 2/2017 | Chen | G06Q 50/04 |
| 2017/0072639 A1* | 3/2017 | Levine | B29C 67/0088 |
| 2017/0091476 A1* | 3/2017 | Basheer | G06F 21/6218 |
| 2017/0106598 A1* | 4/2017 | Cama | B29C 67/0088 |

OTHER PUBLICATIONS

Cudak et al., "Three-Dimensional Printing Based on a License," Application and Drawing, filed on Mar. 30, 2016, 33 Pages, U.S. Appl. No. 15/085,240.

Wile, R., "Credit Suisse: 3D Printing Is Going to Be Way Bigger Than What The 3D Printing Companies Are Saying," Business Insider, Sep. 17, 2013, 5 pages, http://www.businessinsider.com/the-3-d-printing-market-will-be-huge-2013-9.

* cited by examiner

THREE-DIMENSIONAL PRINTING BASED ON A LICENSE

BACKGROUND

The present disclosure relates to printing an object with a three-dimensional (3D) printer, and more specifically, to modifying the object based on a license.

3D printing is a new, intriguing, and emerging consumer market. It is projected to be the next profitable market and change the way business is done for many industries (automotive, textile, computer technologies, etc.). Computer technology companies have recently made 3D printing a focus area as a result. 3D printing has many directions in which it can evolve.

SUMMARY

Embodiments of the disclosure provide a system and computer program product for printing an object using a 3D printer. The system and computer program product can receive a schematic for an object to print using a 3D printer. The system and computer program product can further identify, based on the schematic, at least one customizable characteristic of the object that is licensed to a user. The system and computer program product can further modify the at least one customizable characteristic of the object to adjust the print instructions customized for the object. The system and computer program product can further print the modified object.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1C:
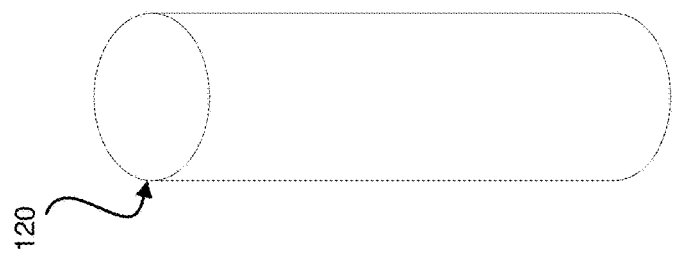
FIGS. 1A, 1B, and 1C depict one or more schematics of a mechanical device, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to three-dimensional printing, more particular aspects relate to modifications of objects created by three-dimensional printing that are based on a license. While the present disclosure is not necessarily limited to such applications, various aspects of the disclosure may be appreciated through a discussion of various examples using this context.

3D printers are becoming a new emerging market within small and large businesses. In some embodiments, 3D printers can be integrated and coupled with software applications. The software applications can comprise a database that can include a plethora of objects that can be printed. The objects could be physical models, electromechanical devices, and mechanical devices. The objects could be patented and there could be an associated license with the object. A consumer could access the objects through the database, as well as, the object's associated intellectual property license or other contractual license. The consumer could then obtain a license for a particular object to print the object. The consumer could also upload a picture or schematic of the object that he wishes to print, and the software application could locate a similar object within the database. When the object has an associated license attached to it, the consumer could purchase a license so that he can print it.

One way that 3D printing could evolve is that of extending the life of a product created by a 3D printer. The service life can be variably (approximately) based on a duration of need and purchase of an appropriate license. 3D printers can print patented objects. The patents could be design or utility patents. The objects could be physical models, electromechanical devices, and mechanical devices. The patented objects could have an associated intellectual property license that could restrict consumers from using the objects based on the patentee's requirements. 3D printers could also print objects that are restricted or limited based on other contractual licenses (e.g., size limitations, field of use limitations, etc.)

In some embodiments, the software application can identify one or more objects with an associated license that are substantially similar to what the consumer wants. In some cases, the consumer may not want a final product printed that is substantially similar to an object that is patented. The object can have an associated object schematic. In some cases, the consumer may want to modify the object based on his or her needs. For example, when the printed object is to be used frequently and the object shown in a schematic (e.g., a depicted object) is to be made of plastic, the consumer may want the plastic to be replaced with metal in the printed object. For another example, when the printed object is a model car that is displayed to the public from only a certain angle, e.g. a model car, the consumer may only want the portion of the model car that is going to be seen by the public. In some cases, the consumer may want to modify the functionality of the depicted object, e.g., increase or decrease movement of the printed object relative to what is described in the design for the object. In this case, the functionality can be replaced with a substantially similar functionality. For example, when a schematic calls for printing a mechanical device configured to move in three dimensions, but the consumer only needs movement in two dimensions, the movement of the printed object can be decreased to two dimensions. In some cases, the substantially similar functionality could be improving the current functionality of an object schematic. In some cases, the substantially similar functionality can include replacing a joint comprising a first material with a second material, e.g. replacing plastic with metal. Modifying a printed object by modifying the object schematic before the printing occurs can save a consumer money.

In some embodiments, modifying an object schematic can be based on a license that is purchased by the consumer. In some cases, the modification can be based on a service life of the object. The service life can be, for example, the amount of time that the object is functionally capable of completing a task. In some cases, a software application can accomplish the modification based on the license and create a plurality of versions of the object schematic displayed within an interactive UI. In some cases, the consumer could modify the object schematic by him or herself. In this case, the software application can restrict the modifications to within the bounds of the license. In some cases, the user could upgrade the license so that he or she is permitted to further modify the object. In some cases, a manufacturer that holds an intellectual property license for a product (e.g., a copyright on the product's schematic or the look of the product itself) can determine the service life and provide the adjusted schematics for the consumer. The determined service life can include the time of life, quality, and appearance of the printed object as described in a specifications sections of a modified schematic. The software application may also provide duration, quality, and appearance of the object in a schematic that is developed independent of the manufacturer or other licensor.

In some embodiments, the software application can capture the consumer's desired duration of the service life of the object schematic to be printed by modifying the cost of the license. In some cases, the cost of the license can be based on a selected duration of service life or functionality. In some cases, the printed object can be statically set (non-functional), e.g., the object can be a physical design or a physical model. In some cases, the object can be statically set by reducing the functionality of a particular part shown in an original product schematic as functional to being nonfunctional. This means that when a particular functionality of the object is not needed by a consumer, the particular function can be statically set, e.g., going from a design for movement of a part in three dimensions to a design for no movement.

In some embodiments, an object's material can be determined with a rate of decay in line with the service life of the object. For example, plastic may be used when the service life is too be short, and metal might be used when the service life is desirably longer or for when the object is to be used often. In some cases, the software application or the consumer can replace parts in a schematic with functional equivalents that are less stable, more stable, or omit details. The modifications may include modifying functionalities of the object as printed, e.g., types of joints, actuators, etc. The modifying may replace joints or other functional parts with solid pieces when the joints are unneeded for a particular consumer's purposes. In some cases, the modifying can include removing gears, e.g., when the product is a clock or engine. In cases of printing a model, e.g. a shoe, the 3D printer can print single sided shoeing when, e.g., 3D details are not needed for all sides.

Figure 1B:
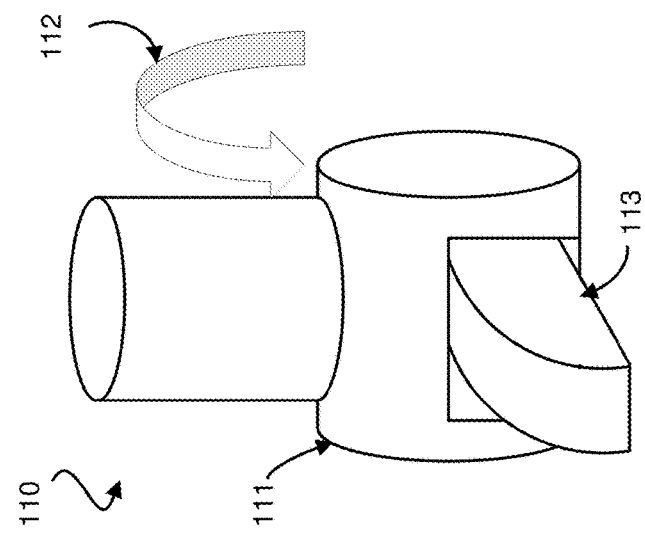
Figure 1A:
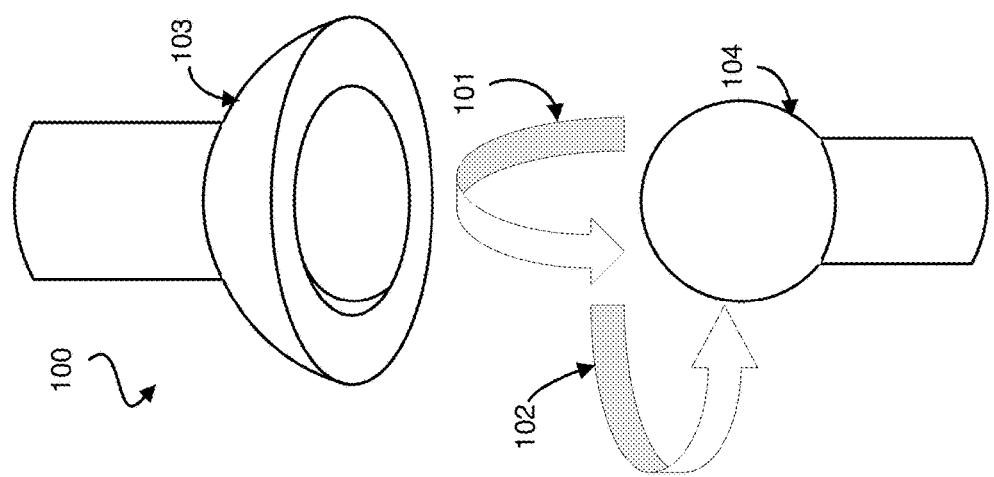

FIGS. 1A-1C are shown as a schematic within in interactive user interface. A user can select any of the three options and can modify the selected option. These represent different equivalents of a same mechanical device, e.g., the movement can differ. In embodiments, these three options can be a functionality of an action figure, e.g., an arm of the action figure that can be printed using a 3D printer. In embodiments, these three options can differ in the functionality, and each selection of the three options can be based on the license associated with a schematic of an object to be printed. For example, each selection of the three options can differ in quality, e.g., material. For example, when the action figure's arm is used often, e.g., daily, the material can comprise a durable material. In this case the service life could provide a duration of time that could permit use of the action figure's arm for daily use. This could occur, for example, by adjusting a schematic of the action figure as delivered by a manufacturer so as to shorten or lengthen the service life of the action figure's arm.

Turning now to FIG. 1A, a schematic of a first selection 100 of three options can be seen, according to various embodiments. In embodiments, the first selection 100 could be the highest quality of the three options. In embodiments, the first selection 100 can include a ball 104 and joint 103 socket type functionality. In embodiments, the ball 104 and joint 103 can provide angular rotations. The angular rotations can span three dimensions, i.e., the x-y plane, x-z plane, and the y-z plane. In embodiments, the three dimensional angular movement can be shown by arrows 101 and 102. In embodiments, the angular movement that the first selection 100 is capable of performing can be rapid and repetitive. In this case the material of the first selection 100 can play a role in the service life of a printed object that includes the first selection 100. In embodiments, this first selection 100 could comprise material that can last for a duration of a service life that a user could choose. The material can be a material that may not last long, and is susceptible to wear and tear, e.g., plastic and rubber. The material can also be a material that may last for years, and is not that easily susceptible to wear and tear, e.g., metal. In some cases, the user may not need the service life to last for as long as the service life of the first selection 100. In some cases, the user may not require the functionality to angular rotation in three dimensions and may, therefore, decide to print an equivalent feature with lesser functionality in the place of the first selection 100.

Now turning to FIG. 1B, a schematic of a second selection 110 of three options can be seen, according to various embodiments. In embodiments, the second selection 110 can include a pivot 113 located within a cylinder 111 that can allow for angular movement in two dimensions. The angular movement in two dimensions can be in the x-y plane, the x-z plane, or the y-z plane. In embodiments, the angular movement can be shown in an arbitrary plane according to arrow 112. In this case the material of the second selection 110 can play a role in the service life. In embodiments, this second selection 110 could comprise material that can last for a duration of a service life that a user could choose, e.g., metal, plastic or a combination thereof. In some embodiments, the pivot 113 could comprise metal and the cylinder could comprise plastic 111.

Now turning to FIG. 1C, a schematic of a third selection 120 of three options can be seen, according to various embodiments. In embodiments, the third selection 120 can be a cylindrical object that may not include any functional movement. In this case, the third selection 120 is the object schematic (or an adjustment to an object schematic), based on a license, that has been made static. In some cases, the user may want to substantially limit functionality of a larger mechanical device to be printed. In some embodiments, the third selection 120 could be a placeholder of a particular function for the larger mechanical device.

As another example, in some embodiments, a printed object to be printed from a three dimensional printer can be an action figure. Continuing the example, the user may only need functionality in a right arm of the action figure, e.g., functional movement of an elbow. The third selection could be a left arm of the action figure that does not include any functional movement of the elbow. In some cases, the printed object may not include any functionality, e.g., the object may be a sculpture or a model. In these cases, the first, second, and third selection 100, 110, and 120, respectively, may differ in the amount of detail of one or more particular aspects of the object schematic, e.g., in FIGS. 2A and 2B.

Figure 2B:
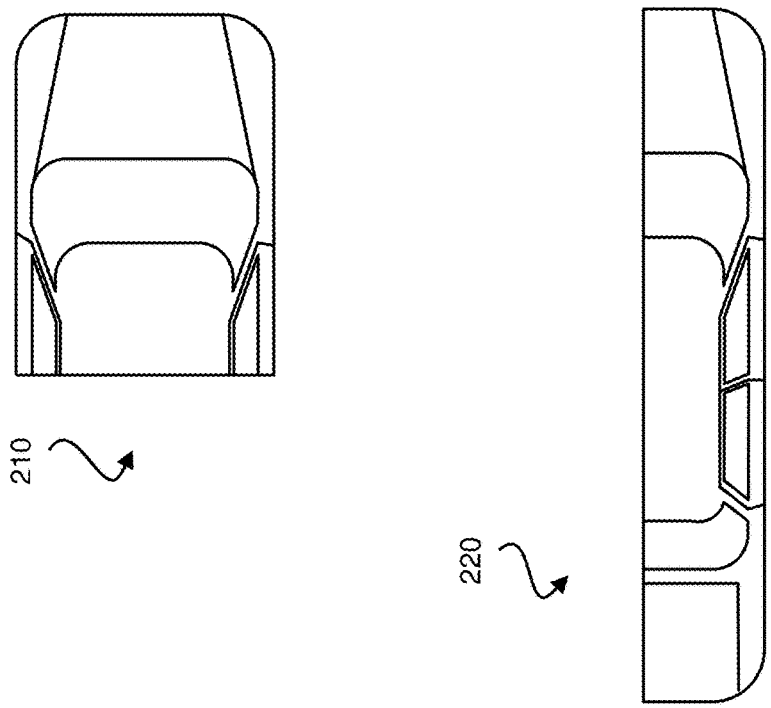
FIGS. 2A and 2B depict one or more schematics of a model car, according to various embodiments.
Figure 2A:
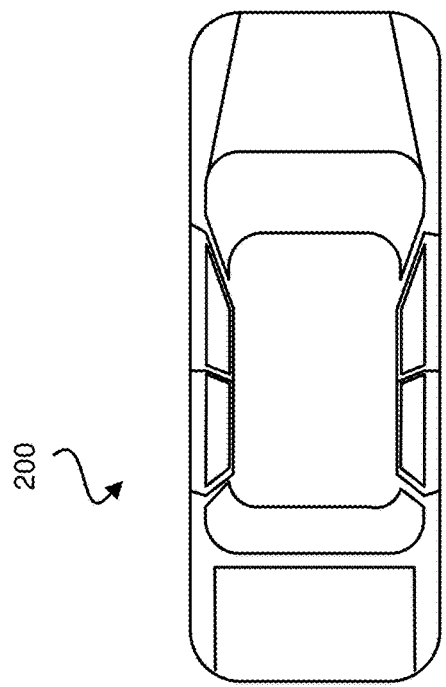

FIGS. 2A and 2B are shown as schematics within in interactive user interface. A user can select any of the three options and can modify the selected option. These represent different equivalents of a same model car. In embodiments, these three options can differ in the quantity of the model car that was printed. In embodiments, these three options can differ by material, and each selection of the three options can be based on the license. For example, each selection of the three options can differ in quality and quantity, e.g., the material and the portion of the model car printed, respectively. For example, a model car designer might want to showcase a model car. In this case, he might only want to display a portion of the model car to the public. In this case, he might only print out a portion of the model car that would be displayed to the public.

Turning now to FIG. 2A, a top down view of a first model selection 200 of three model options for a model car can be seen, according to various embodiments. In embodiments, the first model selection 200 can be an entire model car. In embodiments, the first model selection 200 can include a schematic of the model without any intended loss of detail. In embodiments, the model car could be used as a show car or as a prototype, and the user could be a car designer. The car designer may not want to leave out any detail. In this case, the car designer may want every part of the car to be visible so that the public can view it. In some cases, the user may only want or need to show half of the car, e.g., if the car was on a display.

Now turning to FIG. 2B, a top down view of a second model selection 210 and a third model selection 220 can be seen according to various embodiments. In embodiments, the second model selection 210 can include a substantially similar model as the first model selection 200, but includes the front portion of the first model selection 200. In some cases, this may be due to how the model car may be viewed by an audience. In this case, the user may want to purchase a less expensive license that covers printing a portion of the model car.

In some embodiments, the user may want to showcase the model car to the audience from a different angle than how the second model selection 210 can be viewed, e.g., from the side. In such situations the user may select the third model selection 220. This selection can include a substantially similar model as the first model selection 200, but includes the right most portion of the first model selection 200. In embodiments, this view may be preferred when displaying a feature or model that is included in only the right most portion of the model car, or when the right side is substantially similar to the left side. A software application or system can be configured to perform operations of various aspects of the present disclosure.

Figure 3:
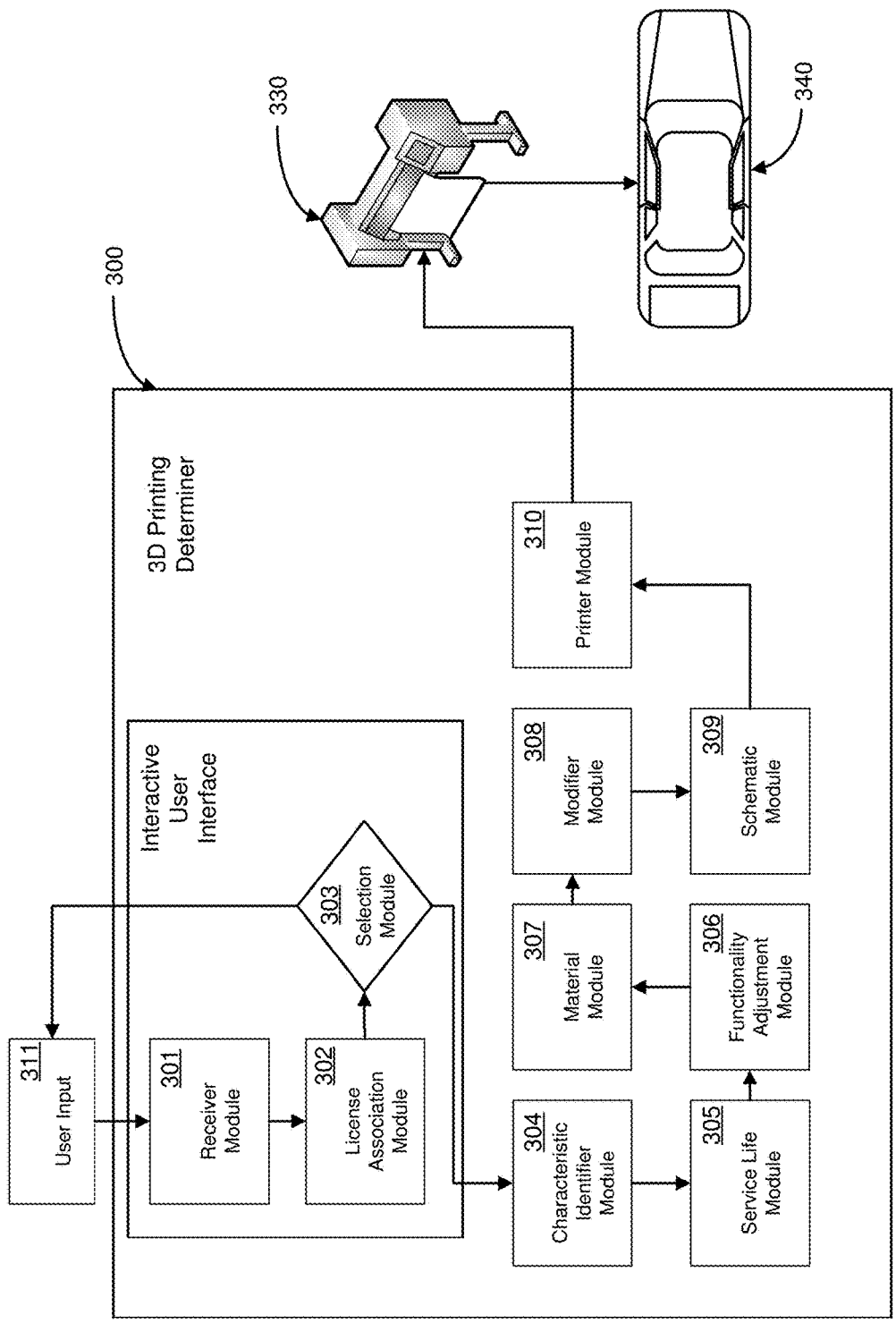
FIG. 3 depicts a module that can be designed to perform operations of various aspects of the disclosure, according to various embodiments.

Now turning to FIG. 3, a 3D printer determiner module 300 can be seen, according to various embodiments. In embodiments, the 3D printer determiner module 300 can perform aspects of the present disclosure. The 3D printer determiner module 300 can be integrated as a software application into a computer of a 3D printer, or can be physically or communicatively coupled with a 3D printer. In some embodiments, an input 311 is entered, e.g., by a user, into, e.g., a user interactive 3D printing application. The user's input could be a design of a mechanical or electromechanical device that the user would like to create with a 3D printer. In some embodiments, the user's input could be an image that is uploaded into the software application. In some embodiments, the user can download a schematic from a website or over a network. In this case, the system can determine a useful service life. In embodiments, the application can send the user's input to a receiver module 301.

In embodiments, the receiver module 301 can receive the user's input 311 and, e.g., digitally scan or upload the image, then match it with one or more matching images that are included in a selection database. The database can include a variety of object schematics that include design and utility functions. In some cases, the objects can have associated intellectual property licenses or other contractual licenses (e.g., a user may be limited in the service life of an object to be printed by a contract with the company that owns the printer he or she uses). In embodiments, once the receiver module 301 has identified an associated license with the user's input, the receiver module 301 can transmit an electrical signal that includes the object's characteristics and the associated license to a license association module 302. In embodiments, the license association module 302 can identify the terms and agreements of the license, then determine a list of options for the user. The list of options can include the cost associated with printing an object with the 3D printer and the life of the associated license. This list of options could be depicted as a chart that include a first column listing the years of the service life and a second column listing the price of each service life. In embodiments, the list can be displayed with an interactive user interface (UI). In embodiments, once the list of options has been displayed, the license association module 302 can transmit an electrical signal to a selection module 303.

In embodiments, the selection module 303 can accept a user's input and the license associated with the objects that are displayed within the list. The user can then select one or more object schematics (or schematics for different parts or aspects of the object), based on its license, within the list on the UI or proceed back to 311 to insert a new user's input. In embodiments, when the user inserts the new user's input the process can proceed back to the user's input module 311. Once a selection has been received, by a user, within the selection module 303, the selection module 303 can transmit an electrical signal that includes selection to a characteristic identifier module 304.

In some cases, the user may want to modify the product design based on how he wants to use the product once it is printed. Modifying can include replacing some of the functionality or the characteristics of the product in order to fit the user's needs. In embodiments, the characteristic determination module can identify at least one customizable characteristic of the product associated with the license, e.g., material. In embodiments, the characteristic identifier module 304 can identify at least one customizable characteristic are based on functionality of the product. In embodiments, the functionality of the product can include movement, e.g., rotational, angular, and transitional movement. In embodiments, the determining functionality can include identifying the dimensional movement of the object's functionality, e.g., two dimensions, three dimensions. In embodiments, once the characteristic identifier module 304 has identified the at least one customizable characteristic of the product, the characteristic identifier module 304 can transmit an electrical signal that includes the information it has obtained to a service life module 305.

In embodiments, the service life module 305 can determine the service life of the product. The service life can be based on the user's needs of the product. For example, the user may want a mechanical device for everyday use, thus the service life may be for a durable mechanical device that may not be prone to wear and tear. In some cases, the service life can also determine the size and the shape of a product, e.g. when the product is a prototype or a model. In some cases, the physical model might only be seen in some angles, for example, referring to FIGS. 2A and 2B, the service life can be fitted so that the physical model is reduced and only displayed at an angle. In some embodiments, the service life of an object to be printed can be the time between one or more failures of the object. For example, when the object to print is a mechanical device has routine maintenance, printing the object so it has an extended service life can extend the time between maintenance. In some cases, the user can determine, then enter, a desired service life. In some cases, the system can determine the service based on a questionnaire that the user can answer that includes questions, such as, expected time of use and desired job use. In embodiments, once the service life module 305 has determined the service life, by the user or computationally by the system based on the user's specifications, the service life module can transmit a value of the service life in the form of an electrical signal to a functional module 306.

In embodiments, the functionality adjustment module 306 can determine a variety of replacements for the functionality of the product (as determined in module 304 or as provided for in an object schematic) where the determined functionality does not correlate with the determined service life. A new functionality can be based on the service life determined by the service life module 305. For example, the functionality can be within an arm of an action figure to be printed. The functionality of the arm as originally designed could include movement in three dimensions, as well as, angular and rotational movement as described in FIGS. 1A, 1B, and 1C. Any of the three selections described in FIGS. 1A, 1B, and 1C can be placed into the joint of the action figure's arm. The functionality of the arm can be reduced from, e.g., moving in three dimensions to moving in two dimensions. In some cases, the functionality of the arm can be restricted to only angular movements. In some cases, the user may want to have the arm functioning in more dimensions than what is listed in the schematic. In this case, the functionality can be modified to include three dimensions per the user's request. In embodiments, once the functionality adjustment module 306 has determined a variety of replacements that could replace the current functionality of the object schematic, the functionality adjustment module 306 can transmit the variety of replacements to a material module 307 in the form of an electrical signal.

In embodiments, the material module 307 can determine one or more materials that can be included in the product. The one or more materials can be based on the service life of the product (as determined in module 305). For example, the product could be redesigned to comprise material that could last for a duration of the service life. The material can be a material that may not last long, and is susceptible to wear and tear, e.g., plastic and rubber. The material can also be a material that may last for years, and may not be easily susceptible to wear and tear, e.g., metal. In some cases, the product can include more than one material. For example, the action figure could have the arm comprising a first material and the rest of the action figure could comprise a second material. The arm might comprise a different material because of the arm might be used more often than the rest of the action figure. In embodiments, once the material module 307 has determined one or more materials, the material module 307 can transmit that information to a modifier module 308 in the form of an electrical signal.

In embodiments, the modifier module 308 can modify the at least one customizable characteristic that could have been identified with the user's input based on the service life. In embodiments, this can include incorporating the functionality adjustments and the material that were determined in modules 306, 307 into the user's input. The modifier module 308 can produce a list of possible products that include permutations of the functionality and the one or more materials so that the user can select a preference. The list could be displayed within a UI. In embodiments, once the modifier module 308 has determined a list of possible permutations, the modifier module 308 can transmit the list in the form of an electrical signal to a schematic module 309.

In embodiments, the schematic module 309 can display each product in the list of permutations as a schematic. In some cases, the schematic could be a modified form of an originally entered schematic. In some cases, the schematic can be displayed within the interactive UI when the user selects a particular permutation. The user can modify a one of the one or more displayed permutations after selecting it. The modifying can include the user replacing a function or a material of the selected permutation. In embodiments, the schematics can be displayed as shown in FIG. 1A-1C and FIGS. 2A and B. In embodiments, once the user has chosen a permutation within the schematic module 309, the schematic module 309 can transmit the selection to a printing module 310 in the form of an electrical signal.

In embodiments, the printing module 310 can be communicatively coupled with a 3D printer 330. In embodiments, the printing module can determine how the 3D printer can print the selected permutation. In embodiments, the 3D printer can receive an electrical signal from the printing module 310. In embodiments, the 3D printer 330 can print the selected permutation 340. In this case, the selected was the model car shown in FIG. 2A. In some embodiments, the 3D printer could have printed either of the model designs from FIG. 2B or FIG. 1A-1C.

Figure 4:
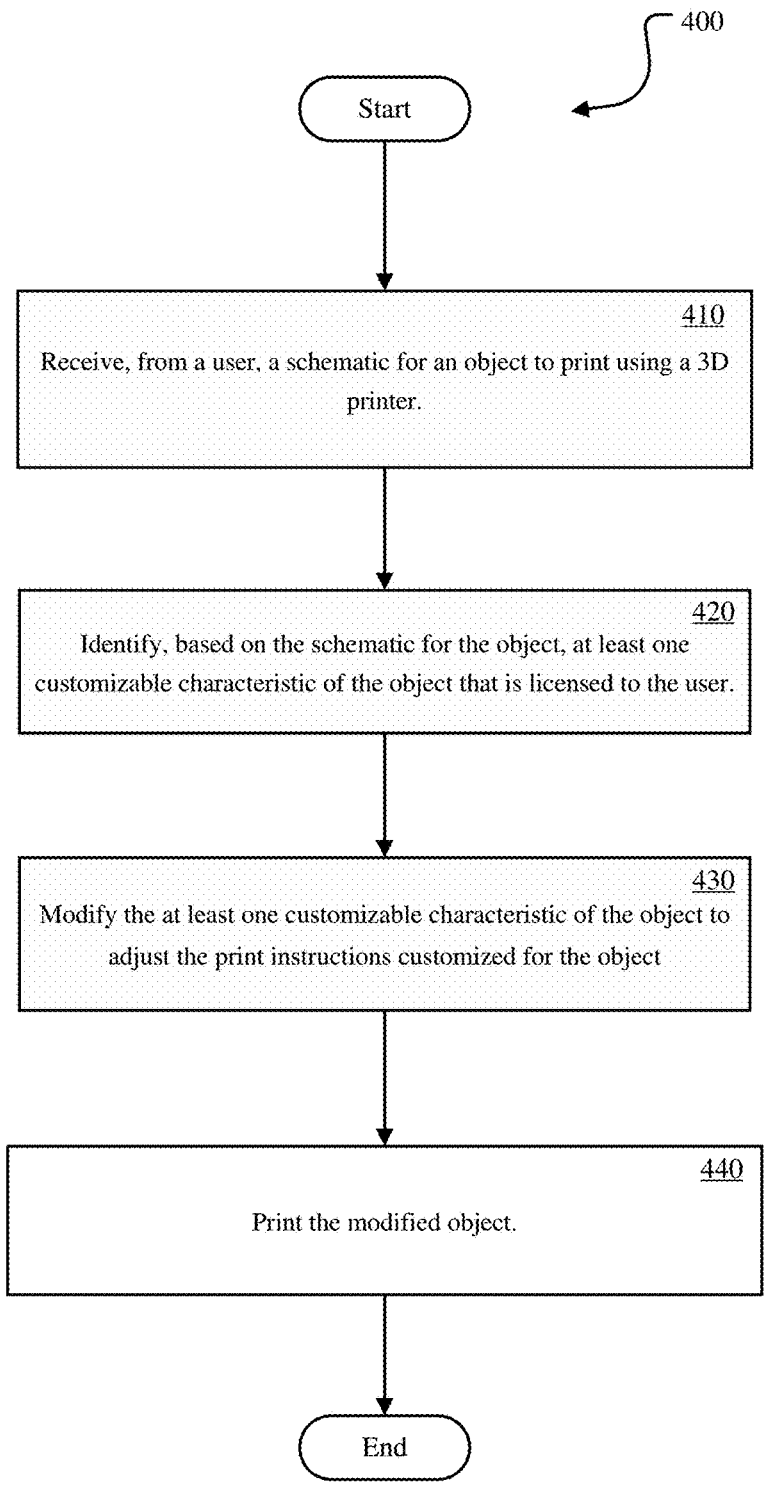
FIG. 4 depicts a flowchart for a method of printing an object, based on a license, using a 3D printer, according to various embodiments.

Now turning to FIG. 4, a flowchart for a method of printing a product, based on a schematic, using a 3D printer can be seen, according to various embodiments. In embodiments, in operation 410, an electronic device (e.g., a computer attached to or embedded within a 3D printer) can receive a schematic for an object to print using a 3D printer. In some cases a user or a manufacturer could input the schematic into the electronic device. In some cases, the user could select the object based on a list of objects or by entering a keyword into the computer or electric device. In some embodiments, the user could upload a digital image of an object into the electronic device. In embodiments, the schematic can be that of a physical design, physical model, electromechanical or mechanical device, or any combination thereof. The schematic can include objects that are not described herein. In embodiments, once operation 410 has received a schematic, operation 410 can proceed to operation 420.

In embodiments, operation 420 can include identifying, based on the schematic, at least one customizable characteristic of the object that is licensed to a user. In embodiments the at least one customizable characteristic could have an associated license. In embodiments, the associated license can be identified by the license association module 302. In some cases, the schematic could include one or more associated licenses for each custom characteristic. In embodiments, the at least one customizable characteristic can include functionality and one or more materials of the object. In embodiments, the functionality can include rotational, angular, and translational movements. In some cases, identifying the functionality can include identifying gears of the object, e.g., when the object is a clock or a motor. In some cases, each gear could have an associated license. In some cases, each of the materials could have an associated license. In embodiments, once the operation 420 has identified the functionality and the material of the object, the operation 420 can proceed to an operation 430.

In embodiments, operation 430 can include modifying, based on a license associated with the schematic, at least one customizable characteristic of the object. In embodiments, the license and the schematic can be the same as they are described herein. In embodiments, the user can select a permutation of the schematic that includes a combination of functionalities and materials from a displayed list. In embodiments, the user can further modify the characteristics of the permutation. In embodiments, the user can choose a permutation that is based on his needs. In embodiments, the user can modify the identified characteristics within an interactive UI. In some cases, the customizable characteristic could be the size of the object. For example, in some embodiments, modifying can include increasing or decreasing a size of the object, e.g., printing half of the object as in FIG. 2B. In some cases, the customizable characteristic could be the material of the object. For example, modifying can include replacing a first material of the object with a second material. In some cases, the customizable characteristic could be a range of motion of an object, e.g., a joint or gear. For example, the customizable characteristic can be an arm of an action figure and modifying can include changing the arm of the action figure as described in FIG. 3. In embodiments, once operation 430 has modified the at least one customizable characteristics of the object, operation 430 can proceed to an operation 440.

In embodiments, operation 440 can include printing the object. Printing can include printing a physical design, a physical model, or an electromechanical or mechanical device. In embodiments, the printed object can be added to and upgraded after the printing has occurred. For example, once the object is incapable of performing its function, the printer can replace the certain nonfunctioning parts of the printed object so that the object is capable of performing its function. In some cases, once its service life has ended, the printed object can be upgraded. In some cases, the printed object can be upgraded before expiration of the service life. In some cases, the customizable characteristic of the object can be replaced before or once the service life has expired. In some cases, the characteristics can be improved by increasing the functionality and/or increasing the quality of the material. Increasing the quality of the material can be achieved by replacing the material with a longer lasting and more durable material. This can be the case when a user purchases a new license or upgrades his or her license (e.g., with the user's 3D printing company, with his schematics supplier, etc.). The user can select or the system can determine a second set of characteristics for the object when the user upgrades his or her license. The second set of customizable characteristics can include material and functionality of a higher quality than the functionality and material that the object currently includes. In embodiments, the printing can be achieved by the 3D printer 330. Once the operation 440 has printed the object, the method can conclude.

An example scenario for method can include a software application that can be integrated into a computer system of a 3D printer. In embodiments, the software application or the computer system of the 3D printer can receive an input from a user. The input can be a selection of an object schematic to be printed by the 3D printer. The object schematic can be for a physical model, mechanical, or electromechanical device. In some embodiments, the computer system or software application can identify characteristics of the object schematic that can include functionality and material. Several options can be displayed within an interactive UI that include the identified characteristics. The identified characteristics can be based on a license that the user might have purchased that is associated with one or more schematics of the object (e.g., such a license could include a license with a printing company that it will only print objects from schematics if the objects meet certain service life requirements). The user can select a preferred object schematic within the UI. The user can modify the characteristics of the object schematic by replacing the characteristics with functional equivalents that can fall within a scope of the license. The 3D printer can print the object when the user accepts the object schematic.

Figure 5:
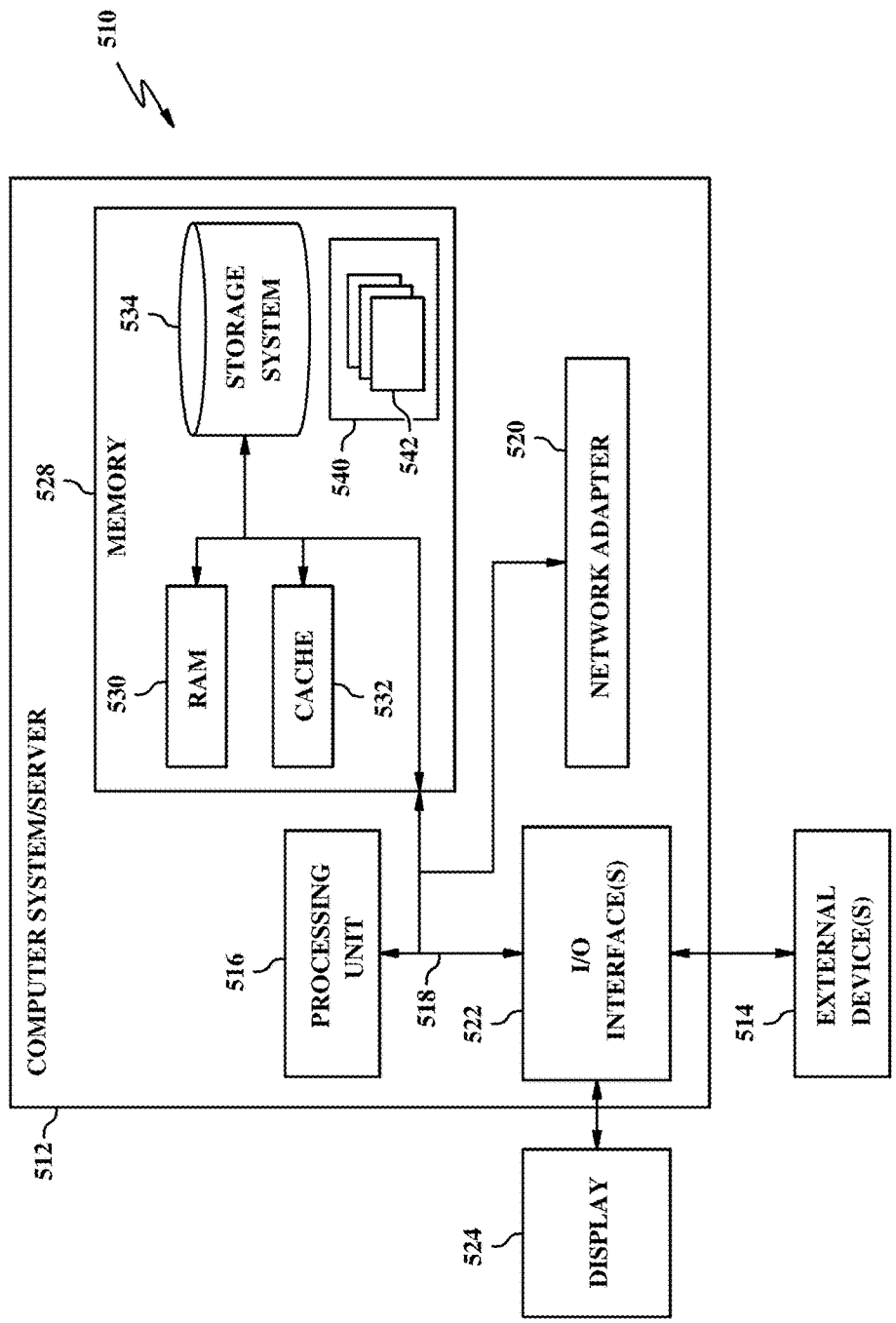
FIG. 5 illustrates a block diagram of a computer system that can print an object, based on a license, using a 3D printer, according to various embodiments.

In some embodiments, the operations and modules described herein can be included within and performed by components of a computer (e.g., a processor), such as the computer system described in FIG. 5.

FIG. 5 depicts a high-level block diagram of a system for implementing embodiments of the disclosure. The mechanisms and apparatus of embodiments of the present disclosure apply equally to any appropriate computing system. The major components of the computer system 500 comprise one or more processors 506, a main memory 504, a terminal interface 510, a storage interface 512, an I/O (Input/Output) device interface 514, a user I/O device 524, and a storage device 526, all of which are communicatively coupled, directly or indirectly, for inter-component communication via a memory bus 518, an I/O bus 520, and an I/O bus interface unit 522.

The computer system 500 may contain one or more general-purpose programmable central processing units (CPUs) 506A, 506B, 506C, and 506D, herein generically referred to as the processor 506. In an embodiment, the computer system 500 contains multiple processors typical of a relatively large system; however, in another embodiment the computer system 500 may alternatively be a single CPU system. Each processor 506 executes instructions stored in the main memory 504 and may comprise one or more levels of on-board cache 530.

In an embodiment, the main memory 504 may comprise a random-access semiconductor memory, storage device, or storage medium (either volatile or non-volatile) for storing or encoding data and programs 534. In another embodiment, the main memory 504 represents the entire virtual memory of the computer system 500, and may also include the virtual memory of other computer systems coupled to the computer system 500 or connected via a network. The main memory 504 is conceptually a single monolithic entity, but in other embodiments the main memory 504 is a more complex arrangement, such as a hierarchy of caches 530 and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 504 may store all or a portion of the following: RAM 532, cache 530, storage system 536, one or more programs/utilities 534, and at least one set of program modules 538. Although the RAM 532, cache 530, storage system 536, one or more programs/utilities 534, and at least one set of program modules 538 are illustrated as being contained within the memory 504 in the computer system 500, in other embodiments some or all of them may be on different computer systems and may be accessed remotely, e.g., via a network. The computer system 500 may use virtual addressing mechanisms that allow the programs of the computer system 500 to behave as if they only have access to a large, single storage entity instead of access to multiple, smaller storage entities. Thus, while the RAM 532, cache 530, storage system 536, one or more programs/utilities 538, and at least one set of program modules 538 are illustrated as being contained within the main memory 504, these components are not necessarily all completely contained in the same storage device at the same time. Further, although the RAM 532, cache 530, storage system 536, one or more programs/utilities 538, and at least one set of program modules 538 are illustrated as being separate entities, in other embodiments some of them, portions of some of them, or all of them may be packaged together.

In an embodiment, the memory 504 comprise instructions or statements that execute on the processor 506 or instructions or statements that are interpreted by instructions or statements that execute on the processor 506, to carry out the functions as further described with reference to the figures as discussed herein. For example, the memory 504 can store the approved set of motion data and can be compared to the first set of data by the processor 506. The memory 504 can store instructions for extracting information from one or more motion sensors 528, determining the one or more differences, score, as well as, for executing the reaction sequence. The memory 504 can store the information from one or more motion sensors 528 once the motion sensors 528 have been connected to the I/O device interface 514 of the computer system 500. The computer system 500 can be communicatively and connectively coupled to the hardware element. The terminal interface 510 can update the user with a real time analysis of the one or more actions being implemented in method 400.

In another embodiment, the main memory 504 are implemented in hardware via semiconductor devices, chips, logical gates, circuits, circuit cards, and/or other physical hardware devices in lieu of, or in addition to, a processor-based system. In an embodiment, the main memory 504 comprise data in addition to instructions or statements.

The memory bus 518 provides a data communication path for transferring data among the processor 506, the main memory 504, and the I/O bus interface 522. The I/O bus interface 522 is further coupled to the I/O bus 520 for transferring data to and from the various I/O units. The I/O bus interface unit 522 communicates with multiple I/O interface units 510, 512, 514, 524, and 526 which are also known as I/O processors (IOPs) or I/O adapters (IOAs), through the I/O bus 520.

The I/O interface units support communication with a variety of storage and I/O devices. For example, the terminal interface unit 510 supports the attachment of one or more user I/O devices 524, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 524 and the computer system 500, and may receive output data via the user output devices. For example, a user interface may be presented via the user I/O device 524, such as displayed on a display device, played via a speaker, or printed via a printer.

The storage interface 512 supports the attachment of one or more disk drives or direct access storage devices 526 (which are typically rotating magnetic disk drive storage devices, although they could alternatively be other storage devices, including arrays of disk drives configured to appear as a single large storage device to a host computer). In another embodiment, the storage device 526 may be implemented via any type of secondary storage device. The contents of the main memory 504, or any portion thereof, may be stored to and retrieved from the storage device 526, as needed. The I/O device interface 514 provides an interface to any of various other input/output devices or devices of other types, such as printers or fax machines. The network interface provides one or more communications paths from the computer system 500 to other digital devices and computer systems; such paths may comprise, e.g., one or more networks.

Although the memory bus 518 is shown in FIG. 5 as a relatively simple, single bus structure providing a direct communication path among the processors 506, the main memory 504, and the I/O bus interface 522, in fact the memory bus 518 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 522 and the I/O bus 520 are shown as single respective units, the computer system 500 may, in fact, contain multiple I/O bus interface units 522 and/or multiple I/O buses 520. While multiple I/O interface units are shown, which separate the I/O bus 520 from various communications paths running to the various I/O devices, in other embodiments some or all of the I/O devices are connected directly to one or more system I/O buses.

In various embodiments, the computer system 500 is a multi-user mainframe computer system, a single-user system, or a server computer or similar device that has little or no direct user interface, but receives requests from other computer systems (clients). In other embodiments, the computer system 500 is implemented as a desktop computer, portable computer, laptop or notebook computer, tablet computer, pocket computer, telephone, smart phone, or any other appropriate type of electronic device.

FIG. 5 is intended to depict the representative major components of the computer system 500. But, individual components may have greater complexity than represented in FIG. 5, components other than or in addition to those shown in FIG. 5 may be present, and the number, type, and configuration of such components may vary. Several particular examples of such additional complexity or additional variations are disclosed herein; these are by way of example only and are not necessarily the only such variations. The various program components illustrated in FIG. 5 and implementing various embodiments of the invention may be implemented in a number of manners, including using various computer applications, routines, components, programs, objects, modules, data structures, etc., and are referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
a processor; and a computer readable storage medium having program instructions embodied therewith, the program instructions executable by the processor to cause the system to:
receive a schematic for an object to print using a 3D printer;
identify, based on the schematic, at least one customizable characteristic of the object that is licensed to a user;
modify the at least one customizable characteristic of the object to adjust print instructions customized for the object, wherein modifying the at least one customizable characteristic of the object includes reducing, based on the license, service life, such that a service life of the modified object is less than a service life of the object described in the schematic; and
print the modified object.

2. The system of claim 1, wherein the modifying the at least one customizable characteristic of the object further comprises:
identifying functionality of the object; and
determining a substantially similar functionality that reduces the service life of the object.

3. The system of claim 1, wherein the program instructions are further executable by the processor to cause the system to make the object static.

4. The system of claim 1, wherein modifying the object further includes selecting materials of the object, wherein the selection of the materials is based on the service life.

5. The system of claim 1, wherein the program instructions are further executable by the processor to cause the system to:
adjust, based on user input, the at least one customizable characteristic of the object,
wherein the schematic of the object can display the at least one customizable characteristic of the object in an interactive user-interface (UI).

6. The system of claim 1, wherein the license is upgradable, and wherein the program instructions are further executable by the processor to cause the system to:
upgrade, based user input, the license of the object; and
modify, based on the upgrade, a second at least one customizable characteristics of the object.

7. The system of claim 1, further comprising:
calculating a customizable characteristic of the at least one customizable characteristic based on the service life.

8. A computer program product for printing a modified object using a 3D printer based on a schematic, the computer program product comprising a computer readable storage medium having program instructions embodied therewith, wherein the computer readable storage medium is not a transitory signal per se, the program instructions executable by a computer to perform a method comprising:
receiving a schematic for an object to print using a 3D printer;
identifying, based on the schematic, at least one customizable characteristic of the object that is licensed to a user;
modifying the at least one customizable characteristic of the object to adjust print instructions customized for the object, wherein modifying the at least one customizable characteristic of the object includes reducing, based on the license, service life, such that a service life of the modified object is less than a service life of the object described in the schematic; and
printing the modified object.

9. The computer program product of claim 8, wherein the modifying the at least one customizable characteristic further includes:
identifying functionality of the object; and
determining a substantially similar functionality that reduces the service life of the object.

10. The computer program product of claim 8, wherein the method further comprises:
adjusting, by the user, the at least one customizable characteristic of the object,
wherein the schematic of the object can display the at least one customizable characteristic of the object in an interactive user-interface (UI).

11. A system comprising:
receiving a schematic for an object to print using a 3D printer;
identifying, based on the schematic, at least one customizable characteristic of the object that is licensed to a user;
modifying the at least one customizable characteristic of the object to adjust print instructions customized for the object, wherein modifying the at least one customizable characteristic of the object is further based on a service life of the object, wherein the service life is based on a license, wherein the service life is an amount of time that the object is functionally capable of completing a task, the quality, and an appearance of a printed modified object as described in a specifications sections of a modified schematic; and
printing the modified object.

* * * * *